United States Patent Office 3,392,782
Patented July 16, 1968

---

3,392,782
IN SITU PREPARATION OF SURFACE ACTIVE AGENTS IN SUBTERRANEAN FORMATIONS
Howard H. Ferrell and Robert R. Matthews, Ponca City, Okla., assignors to Continental Oil Company, Ponca City, Okla., a corporation of Delaware
No Drawing. Filed Aug. 15, 1966, Ser. No. 572,202
10 Claims. (Cl. 166—9)

---

ABSTRACT OF THE DISCLOSURE

It is disclosed that improved secondary recovery of petroleum from a subterranean formation can be obtained by an in situ preparation of a surfactant by injecting into the formation a slug of hydrocarbon containing a high percent of aromatics followed by injection of a sulfating agent and thereafter propelling the materials through the formation toward a recovery well.

---

This invention relates to secondary recovery of oil from subterranean formations, and more particularly relates to an improved oil recovery process which permits greater depletion of such reservoirs than has generally been possible with processes available in the past. Specifically, this invention relates to producing surface active agents in situ.

It has long been recognized that surface active agents aid in oil recovery from a waterflood, for example see U.S. 3,199,586. Many anionic surface active agents can be prepared on the surface, e.g., in plants devoted to preparation of surfactants, by sulfonation of hydrocarbons. It is also known to prepare surfactants in situ such as is shown in U.S. 3,167,119. However, in this latter patent, the production of the surfactant is dependent upon the composition of the naturally occurring hydrocarbon, thus the amount and distribution of the surfactant is limited or may be absent entirely in the naturally occurring crude. Once the subterranean hydrocarbon is treated, little more surfactant can be formed. Thus, by this invention the amount and nature of the sulfonate can be controlled.

Secondary recovery methods for removing oil from underground (subterranean) formations have become widely used in the industry as older wells either cease producing or the rate of production falls off to low levels. Primary recovery methods, e.g., those based upon use of the natural reservoir energy, seldom produce more than about one-third of the oil originally in place, and secondary methods utilizing energy supplied from external sources are required to reduce the amount of oil which is ultimately left behind. The secondary recovery methods most widely used to date are those in which fluid is introduced into the reservoir, either with or without prefracturing, through one or more injection wells in order to displace the oil toward one or more production wells from which it can be recovered. Fluids which can be employed in this manner include water, air, natural gas, carbon dioxide, liquefied petroleum gases and the like. By use of such secondary recovery methods, the total oil recovered is greatly increased; however, a great deal of unrecovered oil still remains in the formation.

As has been mentioned above, surfactants have been employed to increase the recovery of the oil by these secondary methods; however, by the prior art methods, it has required expensive processing equipment, and the heat of reaction, which is advantageous in the formation, is dissipated. The in situ preparations have been dependent upon the aromatic content of the naturally occurring oil, and is thereby limited in its application.

It is an object of this invention to provide a method to improve the secondary recovery of oil from a subterranean formation.

It is another object of this invention to provide a method of preparing in situ a surfactant useful in removing residual oil from a subterranean formation.

It is still another object of this invention to provide a method of preparing an aryl sulfonate in situ in a subterranean formation.

Still other objects, features and advantages of this invention will be apparent to those skilled in the art of oil production from the following description.

According to this invention, a suitable slug of hydrocarbon containing a high percentage of aromatic is first injected into an injection well until a slug of (desired volume of) the hydrocarbon is formed in the formation around the injection well, and this is followed by sufficient sulfonating agent to convert the aromatics to the aryl sulfonate. The reaction product is then propelled through the formation by a suitable driving fluid as is presently known in the art. Preferably, the fluid around the injection well will be displaced by anhydrous ammonia prior to introducing the aromatic containing hydrocarbon and also preferably the driving fluid will be a basic material to react with the sulfonated material forming the salt of the base.

In a preferred manner of carrying out the invention, a slug of anhydrous ammonia is first injected into the injection well, preferably under sufficient pressure to maintain the ammonia in the liquid state; however, it can be injected as gaseous ammonia or even as aqueous ammonia.

The ammonia slug has two chief purposes. First, it will push ahead of it a considerable portion of the connate water. By using anhydrous ammonia, this will allow the subsequent sulfonation to take place in a relatively dry environment. Secondly, as the ammonia slug is driven through the formation, it will leave in its wake a solution of ammonium hydroxide which aids in neutralizing the organic sulfonic acids formed in the subsequent steps. The ammonium sulfonate thus produced will give lower oil-water interfacial tension than will the unneutralized sulfonic acid. Furthermore, the increased pH at the producing wells will help to reduce corrosion.

Other basic aqueous solutions can be used, e.g., NaOH, KOH, CaOH and other alkali metal or alkaline earth metal hydroxides can be used in this step, or this step can be omitted altogether.

The first essential step, or second step in the preferred operation, is to inject a slug of liquid hydrocarbon which contains a high percent of aromatics, e.g., at least 10 percent aromatic and preferably at least 40 percent aromatic. The aromatics form water soluble sulfonates, e.g., of benzene, alkylbenzenes, naphthalene, alkylnaphthalene and the like.

Following the injection of the aromatic hydrocarbon, a slug of sulfonating agent is injected. This slug can be injected either in liquid or gaseous form and may be pure or diluted as desired. When diluted, the diluent should be essentially inert to the reactants and the crude. Such diluents as nitrogen, sulfur dioxide, carbon tetrachloride and the like are useful.

The final step is to propel the preceding slugs through the formation, preferably with a neutralizing drive fluid which can be liquid or gaseous. However, any driving fluid can be utilized, e.g., water or another hydrocarbon, a gas such as air, $CO_2$, nitrogen and the like.

As has been indicated, the function of the optional first step is to dissipate the connate fluid in the formation adjacent to the injection well and the fluid in the injection well, particularly water. Thus, any fluid which will accomplish this purpose without reacting adversely with the oil to be recovered or interfering with the sulfonation step can be employed. Thus, natural gas (either liquid or gaseous), nitrogen, hydrocarbon or the like can be employed; however, it is desirable that this fluid be capable of reacting with the organic sulfonic acid to be subsequently formed. Therefore, to accomplish both the drying and neutralizing effect, an anhydrous ammonia, either liquid or gaseous, is preferred. However, where only neutralization is desired, aqueous ammonia, alkali or alkaline earth hydroxides can be employed. Included in such material would be ammonia, ammonium hydroxide, sodium hydroxide, lithium hydroxide, potassium hydroxide, calcium hydroxide, magnesium hydroxide, barium hydroxide and the like.

The preferred aromatic containing hydrocarbon should contain at least 40 percent aromatic capable of forming a water soluble sulfonate salt, and is generally obtained from a refining stream such as kerosene fraction, reformer aromatic cut, cracking aromatic cut and the like. However, alkylated aromatics such as alkylated benzene and naphthalenes can be used. That is, the hydrocarbon will contain an aromatic such as benzene, naphthalene, alkylbenzene, alkylnaphthalenes, phenylalkanes, toluene and the like. Specific examples of these would include 1,3-diethylbenzene, butylbenzene, octylbenzene, heptylnaphthalene, 2-phenyldodecane, 3-phenyldecane, 2,5-diphenyldodecane, butylnaphthalene, 1-propyl-5-butylnaphthalene and the like, as well as benzene, naphthalene, and toluene. In general, these refinery obtained aromatics generally will contain 10 to 80% aromatics and preferably will contain at least 40% aromatics.

The sulfonating agent can be injected either as a gas or liquid, and any such agent known to the art can be employed. Exemplary of such agents are 100% $SO_3$, aqueous sulfuric acid, fuming sulfuric acid, chlorosulfonic acid, fluosulfonic acid, or it can be any of the foregoing diluted with an inert material such as sulfur dioxide, carbon tetrachloride, nitrogen, air and the like.

The driving fluid, as previously stated, is a neutralizing fluid, that is, it forms a salt with the organic sulfonic acid, and can be an aqueous solution of a base such as ammonia or an alkali or alkaline earth metal hydroxide of the type useful in the optional first step.

Alternately, the driving fluid can be gaseous fluid containing ammonia. Preferably, the gaseous fluid will contain at least 2% ammonia and more preferably at least 5% ammonia, the range generally being 5% to saturated ammonia. Suitable gases include natural gas, nitrogen, $CO_2$, air and the like.

Example

To illustrate the advantages of this invention, cores of 2″ diameter and 6′ long were cut from Berea sandstone. In all cases, the cores were first saturated with water containing 50,000 p.p.m. of sodium chloride. The cores were then flooded with SAE 80 pale oil until no more water could be displaced. Next the cores were waterflooded with brine until no more oil was produced. In Run 1, 80 pale oil containing less than 2% aromatics was used as the hydrocarbon; in Run 2, a light cycle gas oil containing approximately 60% aromatics was injected; and in Run 3, no additional hydrocarbon was utilized. The results are shown in the table.

TABLE

|  | Runs | | |
|---|---|---|---|
|  | 1 | 2 | 3 |
| Oil originally in place (cc.) | 605 | 618 | 601 |
| Oil produced by waterflood (cc.) | 225 | 234 | 229 |
| Oil remaining after waterflood (cc.) | 380 | 374 | 372 |
| Hydrocarbon injected after waterflood [3] | 80 | [1] LCGO | None |
| Amount of hydrocarbon injected (cc.) | 12.5 | 12.5 | |
| $SO_3$ injected (cc.) | 33 | 40 | 36 |
| Additional oil produced (cc.) | 78 | 123 | 99 |
| Recovery or percent oil in place after injection of hydrocarbon (percent). | 20 | 31 | 27 |

[1] LCGO = Light cycle gas oil.
[2] Pale.

From the table, it can be seen from Run 2 (which illustrates the invention) that the hydrocarbon containing a high percent of aromatic materially increases the recovery of residual oil after waterflood.

This invention has been described in a preferred embodiment; however, it will be obvious that modifications as set forth in the general disclosure can be employed to advantage in improving the recovery of residual oil in a subterranean formation.

Having thus described the invention, we claim:

1. A secondary oil recovery process comprising in sequence (1) injecting a basic fluid into an injection well (2) injecting a hydrocarbon containing at least 10 percent aromatics which upon sulfonation form a water soluble sulfonate into said injection well, (3) injecting a sulfonating agent into said injection well to react with the aromaitc in said hydrocarbon and (4) propelling the sulfonated material toward a production well with a driving fluid wherein the driving fluid neutralizes the sulfonic acid formed in step (3).

2. The process of claim 1 wherein the aromatic containing hydrocarbon contains 40 to 80% aromatics.

3. The process of claim 2 wherein said basic fluid is anhydrous ammonia.

4. The process of cliam 3 wherein the sulfonating agent is sulfur trioxide, sulfuric acid, fuming sulfuric acid, chlorosulfuric acid or fluosulfuric acid.

5. The process of claim 4 wherein the sulfonating agent is diluted with an inert diluent.

6. The process of claim 5 wherein said inert diluent is sulfur dioxide or carbon tetrachloride.

7. The process of claim 5 wherein said inert diluent is nitrogen.

8. The process of claim 6 wherein said driving fluid contains an alkaline material which forms a sulfonic acid salt, with the sulfonated aromatic.

9. The process of claim 4 wherein said driving fluid is an aqueous solution of an inorganic base.

10. The process of claim 4 wherein said driving fluid is a gas containing at least 5 percent ammonia.

References Cited

UNITED STATES PATENTS

| 2,839,466 | 6/1958 | Shock et al. | |
| 3,070,165 | 12/1962 | Stratton | 166—42 |
| 3,167,119 | 1/1965 | Meadors | 166—9 |
| 3,259,187 | 7/1966 | Prats et al. | 166—38 X |
| 3,302,711 | 2/1967 | Dilgren | 166—38 X |
| 3,302,713 | 2/1967 | Ahearn et al. | 166—9 |

STEPHEN J. NOVOSAD, *Primary Examiner.*